(12) United States Patent
Aikawa et al.

(10) Patent No.: US 7,850,813 B2
(45) Date of Patent: Dec. 14, 2010

(54) METHOD FOR PRODUCING A FUNCTIONAL MEMBER HAVING NO BASE MATERIAL

(75) Inventors: Takayuki Aikawa, Saitama (JP); Masashi Sekiguchi, Koga (JP); Hideki Etori, Saitama (JP); Takehiro Sasaki, Saitama (JP); Shingo Ohsaku, Saitama (JP)

(73) Assignee: Kimoto Co., Ltd., Tokyo (JP)

( * ) Notice: Subject to any disclaimer, the term of this patent is extended or adjusted under 35 U.S.C. 154(b) by 165 days.

(21) Appl. No.: 12/219,009

(22) Filed: Jul. 15, 2008

(65) Prior Publication Data

US 2009/0020220 A1 Jan. 22, 2009

(30) Foreign Application Priority Data

Jul. 17, 2007 (JP) ............................. 2007-186097
Sep. 13, 2007 (JP) ............................. 2007-237738

(51) Int. Cl.
*B29C 59/00* (2006.01)

(52) U.S. Cl. .................. 156/245; 156/246; 156/247; 156/249; 156/272.2; 156/273.3; 156/273.5; 156/275.5; 156/306.6; 156/306.9; 156/344; 156/584

(58) Field of Classification Search ................ 156/245, 156/246, 247, 249, 272.2, 273.3, 273.5, 275.5, 156/306.6, 306.9, 344, 584
See application file for complete search history.

(56) References Cited

U.S. PATENT DOCUMENTS

| | | | | | |
|---|---|---|---|---|---|
| 5,254,390 | A | * | 10/1993 | Lu | 428/156 |
| 5,743,981 | A | * | 4/1998 | Lu | 156/182 |
| 5,993,600 | A | * | 11/1999 | Ueda et al. | 156/379.8 |
| 6,113,836 | A | * | 9/2000 | Sakai et al. | 264/400 |
| 6,325,880 | B1 | * | 12/2001 | Yamashita et al. | 156/209 |
| 2002/0062915 | A1 | * | 5/2002 | Matsumoto et al. | 156/245 |

FOREIGN PATENT DOCUMENTS

| | | |
|---|---|---|
| JP | 08-166502 | 6/1996 |
| JP | 2005-084397 | 3/2005 |

* cited by examiner

*Primary Examiner*—Kat Wyrozebski
*Assistant Examiner*—Joshel Rivera
(74) *Attorney, Agent, or Firm*—Bacon & Thomas PLLC

(57) ABSTRACT

A method for manufacturing a thin functional member having no base material, which exhibits a special function and is free from curling caused by the base material. The method includes the following steps (1) to (4): (1) filling a functional layer comprising an ionizing radiation curable resin between a base material and a mold having a predetermined concavo-convex pattern, (2) irradiating the filled functional layer with ionizing radiation to half-cure the functional layer, and then delaminating the functional layer and the base material from the mold, (3) adhering an adhesive sheet to a part of the functional layer, and delaminating the functional layer from the base material starting from a portion to which the adhesive sheet is adhered, and (4) irradiating the functional layer with ionizing radiation again to further cure the functional layer.

20 Claims, 4 Drawing Sheets

METHOD FOR PRODUCING A FUNCTIONAL MEMBER HAVING NO BASE MATERIAL

TECHNICAL FIELD

The present invention relates to a functional member which can exhibit a specific function, and a method for efficiently producing a functional member having no base material (a base material-less functional material) which can prevent the bad effect of having a base material, i.e., generation of curl in the functional member, and can be made the member thinner at the same time.

BACKGROUND ART

In recent years, there have been proposed functional members which can exhibit various functions such as various optical films including light diffusing films, light control films, prism sheets, Fresnel lens sheets, lenticular lens sheets and nonreflective films, cell culture chips, DNA chips, biodevices and energy devices. Such functional members usually use a polyester type film showing superior dimensional stability and mechanical strength as a base material as one of constituents of the members, and a functional layer having a concavo-convex pattern which can exhibit various functions such as a light diffusing layer, mat layer, backcoat layer, nonreflective layer and lens layer is provided.

As methods for producing such functional members generally used, there are, for example, the 2T (Thermal-Transformation) method in which a functional layer is formed by continuously extruding a melted thermoplastic resin to supply it on a base material, and then pressing a mold roll onto the thermoplastic resin to transfer a concavo-convex pattern of the mold roll surface to the thermoplastic resin and thereby form concave and convex shapes on the surface of the thermoplastic resin, the 2P (Photo-Polymer) method in which a mold roll is pressed on an ionizing radiation curable resin layer prepared beforehand on a base material, and the layer in that state is irradiated with ultraviolet radiation from the back side of the base material to cure the ionizing radiation curable resin layer and thereby form a functional layer to which a concavo-convex pattern is transferred, and so forth (Patent documents 1 and 2).

[Patent document 1] Japanese Patent Unexamined Publication (KOKAI) No. 2005-84397 (claims)
[Patent document 2] Japanese Patent Unexamined Publication (KOKAI) No. 8-166502 (Related Art)

DISCLOSURE OF THE INVENTION

Object to be Achieved by the Invention

In order to produce a functional member, a base material is usually needed for forming a functional layer as described above. In the case of the 2P method, the functional layer is constituted by an ionizing radiation curable resin or the like, and in order to cure the resin, it is necessary to irradiating it with ionizing radiation. At the time of the irradiation, there may arise a difference of shrinking ratio between the functional layer and the base material due to curing and shrinking of the functional layer caused by the irradiation of ionizing radiation, and curl may be generated in the functional member.

Moreover, further thinner constituents are required for various instruments such as cellular phones and PDAs in recent years. To satisfy this requirement, it is attempted to make such constituents thinner by using a thinner base material. However, if it does so, strength of the base material is decreased, and the generation of curl mentioned above becomes more marked. If the base material itself, which is one of the constituents of the functional member, can be eliminated in order to solve the problem mentioned above, generation of curl can be suppressed.

As described above, it has been desired to efficiently produce functional members which can exhibit a specific function, generates no curl, and miniaturize the constituents.

Means for Achieving the Object

The inventors of the present invention assiduously conducted various researches in order to achieve the aforementioned object, and as a result, found that if the functional layer was made to be in a half-cured state by controlling the dose of ionizing radiation, it became possible to delaminate the base material, which had been required to produce a functional member, from the functional layer without causing degradation of function due to destruction of the layer, and a thinner functional member could be produced while preventing generation of curl. Moreover, they also found that by making the functional layer in a half-cured state, adhesion to a protective sheet used for delamination of the base material was improved, and thus a base material-less functional member could be produced with good workability.

That is, the method for producing a base material-less functional member of the present invention comprises successively performing (1) the step of forming a functional layer comprising an ionizing radiation curable resin between a mold having a predetermined concavo-convex pattern and a base material, (2) the step of irradiating the functional layer with ionizing radiation to half-cure the functional layer, and then delaminating the functional layer and the base material from the mold, and (3) the step of delaminating the functional layer from the base material.

Further, in the method for producing a base material-less functional member of the present invention, the step of irradiating the functional layer with ionizing radiation again to further cure the functional layer is preferably performed after the step (3).

Moreover, in the method for producing a base material-less functional member of the present invention, in a state that the functional layer is half-cured, adhesion strength between the base material and the functional layer is preferably not higher than 2.5 N/25 mm.

Furthermore, in the method for producing a base material-less functional member of the present invention, the base material-less functional member is preferably a prism sheet.

In the first embodiment of the method for producing a base material-less functional member of the present invention, (1) the step of laminating the functional layer comprising an ionizing radiation curable resin and the base material on the mold having a predetermined concavo-convex pattern in this order, (2) the step of irradiating the functional layer with ionizing radiation to half-cure the functional layer, and then delaminating the functional layer and the base material from the mold, and (3) the step of delaminating the functional layer from the base material are successively performed.

In the first embodiment, the step (3) comprises the step of adhering a protective sheet to at least a part of the functional layer, and delaminating the functional layer and the protective sheet from the base material. Preferably, (4) the step of delaminating the protective sheet from the functional layer is performed after the step (3).

In the first embodiment, preferably, the protective sheet has an adhesive layer, the adhesive layer contains a curable resin, and after the curable resin is cured by imparting external energy to the curable resin, the protective sheet is delaminated from the functional layer. The curable resin is preferably an ionizing radiation curable resin.

In the second embodiment of the method for producing a base material-less functional member of the present invention, (1) the step of filling the functional layer comprising an ionizing radiation curable resin to which a concavo-convex pattern is transferred between the base material and the mold having a predetermined concavo-convex pattern, (2) the step of irradiating the functional layer with ionizing radiation to half-cure the functional layer, and then delaminating the functional layer and the base material from the mold, and (3) the step of delaminating the functional layer from the base material are successively performed.

In the second embodiment, the step (3) preferably comprises the step of adhering an adhesive sheet to a part of the functional layer, and delaminating the functional layer from the base material starting from a portion to which the adhesive sheet is adhered.

In the second embodiment, adhesion strength between the functional layer and the adhesive sheet is preferably not lower than 5 N/25 mm.

Moreover, in the method for producing a base material-less functional member of the present invention, the base material-less functional member is preferably continuously produced by continuously supplying the base material.

EFFECT OF THE INVENTION

According to the present invention, a base material-less functional member can be produced by performing the aforementioned steps of (1) to (3) in succession, and therefore a base material-less functional member, which can prevent the problem caused by having a base material as in conventional members, namely, generation of curl in the functional member, and can be made thinner at the same time, can be produced with good workability.

According to the first embodiment of the present invention, a base material-less functional member having a protective sheet can be produced by performing the step of adhering a protective sheet in the step (3), and therefore the member can be handled while preventing easy deformation of the functional layer or without generation of scratches during transportation.

According to the second embodiment of the present invention, by performing the step of adhering an adhesive sheet to a part of the functional layer in the step (3), time and labor required for removing an adhesive sheet can be reduced, delamination electrification which may be caused at the time of removal of the adhesive sheet by delamination can be eliminated, and therefore a base material-less functional member can be efficiently produced with good workability.

According to the present invention, a functional member having no base material can be prepared, and the method is suitable for the production of prism sheets used especially for cellular phones, PDAs and so forth, of which constituents are required to be made thinner. Moreover, according to the present invention, a functional member generating no curl and having superior flatness can be obtained, and therefore the method is suitable for the production of prism sheets which are required to show highly precise directivity for light.

Figure 1:
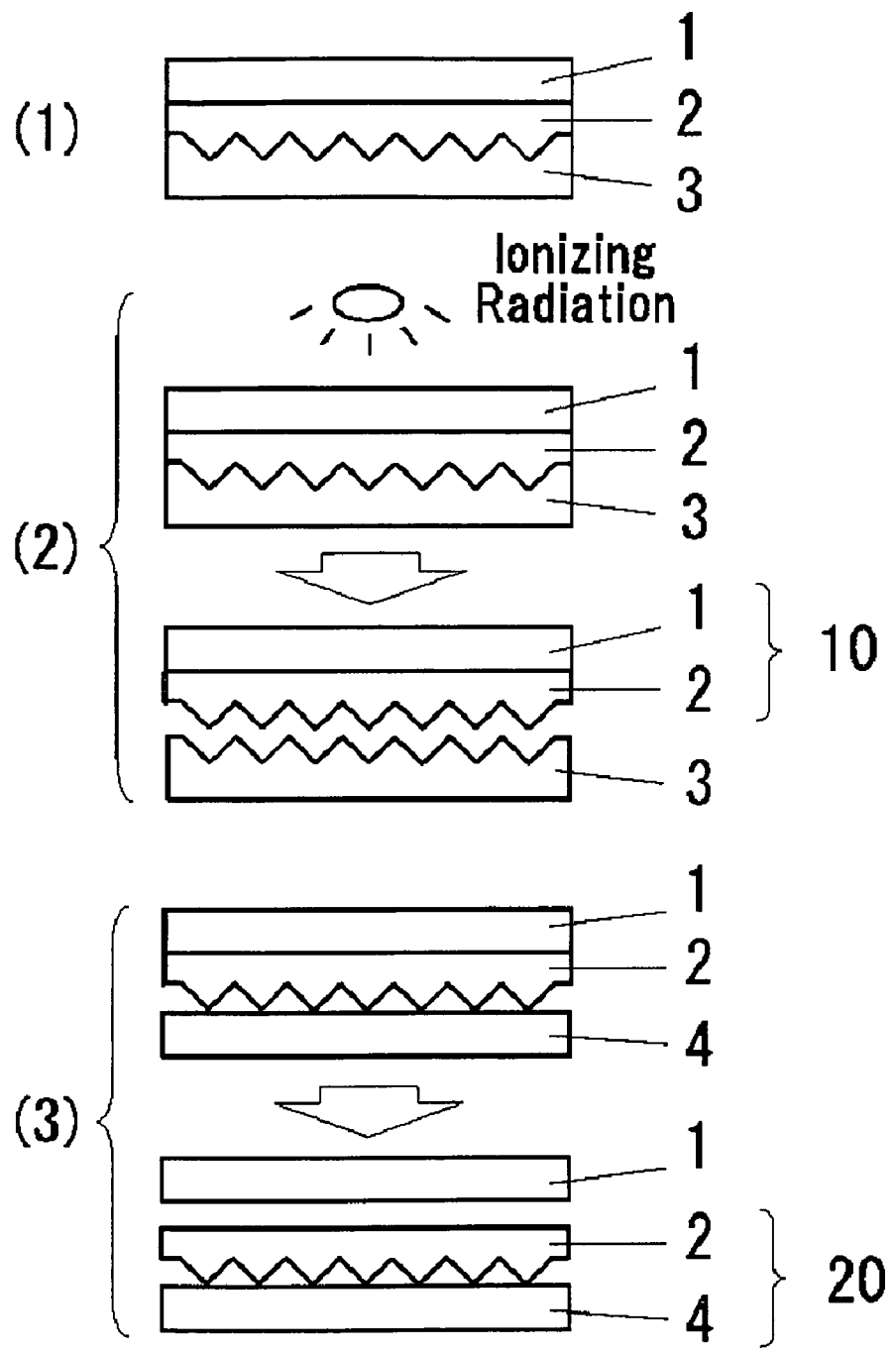
FIG. 1 is a sectional view showing the first embodiment of the method for producing a base material-less functional member of the present invention.

In the drawings, 1 is a base material, 2 is a functional layer, 3 is a mold, 4 is a protective sheet, 5 is an adhesive sheet, 10 is a functional member, 20 is a base material-less functional member, a is total thickness of functional layer, b is thickness of concavo-convex portion and c is thickness of solid portion.

BEST MODE FOR CARRYING OUT THE INVENTION

Hereafter, embodiments of the method for producing a base material-less functional member of the present invention will be explained.

The method for producing a base material-less functional member of the present invention comprises (1) the step of forming a functional layer comprising an ionizing radiation curable resin between a mold having a predetermined concavo-convex-pattern and a base material, (2) the step of irradiating the functional layer with ionizing radiation to half-cure the functional layer, and then delaminating the functional layer and the base material from the mold, and (3) the step of delaminating the functional layer from the base material.

The step (1) may be the step of laminating the functional layer comprising an ionizing radiation curable resin and the base material in this order on the mold having a predetermined concavo-convex pattern (method 1), or the step of filling the functional layer comprising an ionizing radiation curable resin, to which a concavo-convex pattern is transferred, between the base material and the mold having a predetermined concavo-convex pattern (method 2).

The step (3) may be the step of adhering a protective sheet to at least a part of the functional layer and delaminating the functional layer and the protective sheet from the base material (method 3), or the step of adhering an adhesive sheet to a part of the functional layer and delaminating the functional layer from the base material starting from a portion to which the adhesive sheet is adhered (method 4).

Hereafter, an embodiment using a combination of the methods 1 and 3 will be explained as the first embodiment of the present invention, and an embodiment using a combination of the methods 2 and 4 will be explained as the second embodiment of the present invention.

First Embodiment

This embodiment is characterized in that the functional layer and the base material are successively laminated on the mold, and a protective sheet for protecting the functional layer is also used for delaminating the functional layer from the base material.

FIG. 1 is a sectional view for explaining the first embodiment of the method for producing a base material-less functional member 20 of the present invention. FIG. 1, (1) shows the step of laminating a functional layer 2 comprising an ionizing radiation curable resin and a base material 1 on a mold 3 having a predetermined concavo-convex pattern, (2) shows the step of irradiating the functional layer 2 with ionizing radiation to half-cure the functional layer 2, and then delaminating a member 10 constituted by the functional layer 2 and the base material 1 from the mold 3, and (3) shows the step of adhering a protective sheet 4 to the functional layer 2, and delaminating the base material-less functional member 20 constituted by the functional layer 2 and the protective sheet 4 from the base material 1. The base material-less functional member 20 is made into a base material-less functional member 2 consisting of a single layer of the functional layer 2 by delaminating the protective sheet 4 as described later.

First, materials commonly used in the embodiments will be explained.

The mold used for the method for producing a base material-less functional member is provided with a predetermined concavo-convex pattern. The mold having a predetermined concavo-convex pattern can be obtained by, for example, forming concaves or convexes having specific shapes on an arbitrary mold by a laser ultra-fine processing technique so that arrangement density thereof should be, for example, several thousands of concaves or convexes/mm$^2$, and using this mold as a male mold to produce a mold for molding (female mold); applying a resin in which particles having predetermined particle sizes are dispersed, drying the resin to produce a resin mold having a concavo-convex layer, and using this mold as a male mold to produce a mold for molding (female mold), or the like.

As the predetermined concavo-convex pattern, for example, in the case of using the functional member as a light control film, about 10 to 200,000/mm$^2$ of concaves having a pitch of about several to 100 μm are preferably formed.

In the case of prism sheet, a concavo-convex pattern (prism surface) having a vertical angle in the range of 80 to 105° and a pitch of about 20 to 50 μm in average is preferably formed as shapes of conventionally known prism sheets.

The functional layer laminated on the mold having a concavo-convex pattern is a layer which has a concavo-convex pattern complementary to the concavo-convex pattern of the mold and thereby can exhibit a specific function. Examples of such a functional layer include light diffusing layers, mat layers, backcoat layers, nonreflective layers, lens layers and so forth, which can exhibit various functions as the whole functional members, for example, various optical films such as light diffusing films, light control films, prism sheets, Fresnel lens sheets, lenticular lens sheets and nonreflective films, cell culture chips, DNA chips, bio-devices, energy devices, and so forth.

The functional layer mentioned above contains an ionizing radiation curable resin. In the present invention, the functional layer and the base material can be delaminated from the mold in a state that the base material and the functional layer are not firmly adhered and in a delaminable state by controlling dose of ionizing radiation irradiated on the ionizing radiation curable resin to half-cure the functional layer as described later. Therefore, when a base material-less functional member is formed, the functional layer can be delaminated from the base material without causing degradation of the function due destruction of the layer. Moreover, since the functional layer is made to be in a half-cured state, the adhesion of the functional layer to the protective sheet mentioned later is improved, and workability in the production of the base material-less functional member of the present invention becomes favorable.

As such an ionizing radiation curable resin used for the functional layer, for example, photopolymerizable prepolymers and photopolymerizable monomers curable by crosslinking upon irradiation of ionizing radiation can be used, and as such photopolymerizable prepolymers, acrylic type prepolymers which have two or more acryloyl groups in one molecule and form a three-dimensional reticular structure upon curing by crosslinking are particularly preferably used. Examples of these acrylic type prepolymers include polyurethane acrylates, polyester acrylates, polyepoxy acrylates, melamine acrylates, polyfluoroalkyl acrylates, silicone acrylates and so forth, and they can be suitably selected depending on types of the mold and the base material, use of the member, and so forth.

As the photopolymerizable monomers, one or more kinds of monofunctional acrylic monomers such as 2-ethylhexyl acrylate, 2-hydroxyethyl acrylate, 2-hydroxypropyl acrylate and butoxyethyl acrylate, bifunctional acrylic monomers such as 1,6-hexanediol diacrylate, neopentylglycol diacrylate, diethylene glycol diacrylate, polyethylene glycol diacrylate and hydroxypivalic acid ester neopentylglycol diacrylate, polyfunctional acrylic monomers such as dipentaerythritol hexaacrylate, trimethylpropane triacrylate and pentaerythritol triacrylate, and so forth are used.

Although these photopolymerizable prepolymers and photopolymerizable monomers may be independently used, they are preferably used in a suitable combination in order to impart various performances such as improvement of property for curing by crosslinking and adjustment of viscosity.

Moreover, when the functional layer is used after curing by ultraviolet irradiation, it is preferable to use additives such as photopolymerization initiators and photopolymerization enhancers, besides the aforementioned photopolymerizable prepolymers and photopolymerizable monomers.

Examples of the photopolymerization initiators include acetophenone, benzophenone, Michler's ketone, benzoin, benzyl methyl ketal, benzoyl benzoate, α-acyl oxime ester, thioxansones, and so forth.

The photopolymerization enhancers can accelerate the curing rate by reducing polymerization disturbance caused by oxygen in the air at the time of curing, and examples include p-dimethylaminobenzoic acid isoamyl ester, p-dimethylaminobenzoic acid ethyl ester, and so forth.

As the resin component of the functional layer, besides the ionizing radiation curable resins mentioned above, other resins such as thermoplastic resins and thermosetting resins may be contained in such an extent that the effect of the present invention should not be degraded.

The functional layer may further contain crosslinking agents, tackifiers, acid proliferation agents, dilution solvents, fillers, colorants, matting agents, lubricants, antistatic agents, flame retardant, antibacterial agents, antifungal agents, ultraviolet absorbers, light stabilizers, antioxidants, plasticizers, leveling agents, pigment dispersing agents, flow regulators, antifoams, and so forth, in such an extent that the effect of the present invention should not be degraded.

Figure 2:
FIG. 2 is a sectional view showing definition of the thickness of the functional layer in the present invention.

Although thickness of the functional layer constituting the functional member is appropriately determined depending on a specific function, the thickness is preferably 200 μm or smaller, and if the layer has a thickness of 50 μm or smaller, it can be produced by the production method of the present invention with good workability. Moreover, the solid portion in the functional layer structure preferably has a thickness of about 2 to 12 μm in view of realizing thinner functional layer as a whole and simultaneously preventing sudden separation or elimination of the concaves and convexes, which function to exhibit the desired function. The thickness of the solid portion referred to here means a distance from the flat surface opposite to the convexo-concave surface of the functional layer to the bottom ends of the concaves and convexes, as indicated with the symbol c in FIG. 2, and the thickness a of the functional layer as a whole is the total thickness of the thickness b of the concaves and convexes and the thickness c of the solid portion. If the functional member is, for example, a prism sheet (prisms have a pitch of 50 μm and a vertical angle of 90°), the thickness of the functional layer as a whole is preferably about 27 to 37 μm (the thickness of the solid portion is 2 to 12 μm).

The base material laminated on the functional layer is not particularly limited, so long as it consists of a material transparent for ionizing radiation, and plates, films etc. consisting of glass or plastics can be used for it. Specifically, plastic films or sheets of polyethylene terephthalate, polybutylene terephthalate, polyethylene naphthalate, polycarbonate, polypropylene, polyethylene, polyarylate, acrylic resin, acetyl cellulose, polyvinyl chloride, and so forth can be used, and in view of dimensional stability, those subjected to stretching, especially biaxial stretching, are preferred.

The base material preferably contains an antistatic agent. By adding an antistatic agent to the base material, delamination electrification, which may take place at the time of the delamination of the base material from the functional layer as described later, can be prevented.

Moreover, the surface of the base material to be brought into contact with the functional layer is preferably subjected to an easy adhesion treatment. By subjecting the base material to an easy adhesion treatment, it becomes easier to make adhesion strength between the base material and the functional layer higher than the adhesion strength between the mold and the functional layer.

Although thickness of the base material is appropriately chosen depending on the concavo-convex pattern to be formed on the functional layer, it is usually preferably 25 to 200 μm.

As for the method for laminating the functional layer and the base material on the mold having a concavo-convex pattern, a coating solution for functional layers prepared by mixing the materials consisting of the aforementioned ionizing radiation curable resin, other resin components and so forth can be coated on the base material mentioned above by a conventionally known method such as bar coating, blade coating, spin coating, roll coating, gravure coating, curtain flow coating, die coating, spray coating and screen printing, and the base material can be laminated on the mold so that the surface of the base material coated with the coating solution for functional layers and the convexo-concave surface having a concavo-convex pattern of the mold should face each other. Alternatively, the aforementioned coating solution can be applied to the convexo-concave surface having a concavo-convex pattern of the mold by an application method such as those mentioned above, and the base material can be laminated so that the surface of the mold coated with the coating solution for functional layers and the base material and should face each other.

The step (2), i.e., the step of irradiating the functional layer with ionizing radiation to half-cure the functional layer, and then delaminating the functional layer and the base material from the mold will be explained below.

The term "half-cure" referred to in the present invention means to cure the functional layer with an irradiation dose of about 1.5 to 70%, preferably about 1.5 to 25%, based on the cumulative dose of ionizing radiation required to completely cure the functional layer, which is taken as 100%, although the irradiation dose may vary depending on material used for the functional layer, thickness of the functional layer, type of the ionizing radiation to be irradiated on the functional layer etc., and it cannot be generally defined.

As for the method for irradiating ionizing radiation to the ionizing radiation curable resin constituting the functional layer, the irradiation can be attained by irradiating a ultraviolet ray in a wavelength region of 100 to 400 nm, preferably 200 to 400 nm, emitted from an ultra high pressure mercury lamp, a high pressure mercury lamp, a low pressure mercury lamp, carbon arc, a metal halide lamp, or the like, or by irradiating an electron beam in a wavelength region of 100 nm or smaller emitted from a scanning type or curtain type electron beam accelerator.

Although the ionizing radiation is usually irradiated from the base material side, it may be irradiated from the mold side, if the mold used in this embodiment is transparent.

The adhesion strength between the base material and the functional layer in a half-cured state attained by the aforementioned irradiation of the ionizing radiation on the functional layer is not particularly limited, so long as the strength is higher than the adhesion strength between the mold having a concavo-convex pattern and the functional layer, and lower than the adhesion strength between the functional layer and the protective sheet mentioned later. However, the upper limit of the strength is preferably 2.5 N/25 mm or smaller in view of the production of the base material-less functional member of the present invention. Further, the adhesion strength between the mold having a concavo-convex pattern and the functional layer in a half-cured state is not also particularly limited, so long as the strength is lower than the aforementioned adhesion strength between the base material and the functional layer. However, it is preferably 2 N/25 mm or smaller in view of making it easy to delaminate the functional layer from the mold, and the lower limit thereof is more preferably 0.2 N/25 mm or higher.

In the step (2), the functional layer 2 is irradiated with ionizing irradiation so that the adhesion strength between the base material 1 and the functional layer 2, and the adhesion strength between the functional layer 2 and the mold 3 should satisfy the relationships described above, and then the functional layer 2 and the base material 1 are delaminated from the mold 3 as shown in FIG. 1, (2).

By delaminating them from the mold in a state that the functional layer is in a half-cured state as described above, degradation of the function resulting from destruction of the functional layer and so forth can be prevented as described above, and the dose of the ionizing radiation irradiated to the functional layer can be decreased compared with the conventional production methods. Therefore, thermal deformation of the base material due to the irradiation of ionizing radiation and undue curing and shrinkage of the functional layer can be prevented, and a functional member with higher precision can be produced.

The step (3), i.e., the step of adhering a protective sheet to the functional layer and delaminating the functional layer and the protective sheet from the base material will be explained below.

The protective sheet has an adhesive property at least to the functional layer, and such a protective sheet showing adhesion strength between the functional layer and the protective sheet higher than adhesion strength between the base material and the functional layer is used. Although the protective sheet may consists of a single layer of an adhesive layer, a multilayer structure comprising a support and an adhesive layer formed on the support is more preferred in view of protection of the functional layer and production operation of the base material-less functional member.

When the protective sheet comprises a support and an adhesive layer, the same materials as those mentioned above for the base material can be used as the support. Although thickness of the support is not particularly limited, it is preferably 30 to 100 μm in consideration of handling property at the time of transportation etc.

As the adhesive layer, conventionally known resins mentioned as adhesives can be used. Examples include, for example, ionizing radiation curable resins, thermosetting resins, thermoplastic resins and so forth, including synthetic resins such as acrylic type resins, epoxy type resins, ethylene/vinyl acetate type resins, polyvinyl ether type resins, polyvinyl acetal type resins, cellulose type resins, polyester type resins, polyurethane type resins, polyamide type resins, polyolefin type resins, phenol type resins and cyanoacrylate type resins, rubber type resins such as those of natural rubber type, reclaimed rubber type, polychloroprene rubber type, nitrile rubber type and styrene/butadiene rubber type, and so forth. The adhesive layer may contain other resins not having adhesive property, including such ionizing radiation curable resins, thermosetting resins and thermoplastic resins, so long as the effect of the present invention is not degraded.

The adhesive layer may further contain crosslinking agents, tackifiers, acid proliferation agents, dilution solvents, fillers, colorants, matting agents, lubricants, antistatic agents, flame retardants, antibacterial agents, antifungal agents, ultraviolet absorbers, light stabilizers, antioxidants, plasticizers, leveling agents, pigment dispersing agents, flow regulators, antifoams, and so forth, in such an extent that the effect of the present invention should not be degraded.

The adhesive layer preferably has a thickness of about 5 to 40 μm. With a thickness in such a range, it can be made easier to obtain desired adhesion ability.

In the step (3), the adhesive layer of the protective sheet 4 mentioned above is adhered to the functional layer 2 of the functional member 10, and the functional layer 2 and the protective sheet 4 are delaminated from the base material 1, as shown in FIG. 1, (3). In FIG. 1, the protective sheet 4 is adhered so that it should cover the substantially whole functional surface of the functional layer 2. More specifically, the protective sheet covers preferably 90% or more, more preferably 100%, of the functional surface of the functional layer 2, in view of protection of the functional layer 2.

According to the method for producing a base material-less functional member of this embodiment, the functional layer in a half-cured state has appropriate tackiness as described above, therefore adhesion between the functional layer and the protective sheet at the time of adhering them can be improved, and a base material-less functional member can be produced with good workability. Moreover, the protective sheet is adhered to the functional layer while the base material and the functional layer are in a delaminable state without firm adhesion of them, and therefore when the base material is delaminated, adverse effect such as destruction of the functional layer is not caused at the time of the delamination of the base material. Furthermore, since the functional surface of the functional layer has the protective sheet, the functional layer can be prevented from being easily deformed at the time of delamination of the functional layer from the base material or storage of the functional member after the delamination, and generation of scratches on the functional member during transportation etc. can be prevented.

In the method for producing a base material-less functional member of this embodiment, the step (4) of delaminating the protective sheet from the functional layer can be further performed after the step (3). The protective sheet used for this embodiment is used not only at the time of delamination of the functional layer from the base material, but also for preventing deformation of the functional surface of the functional layer and generation of scratches on the surface during transportation. However, there may be a case where the protective sheet is preferred to be removed by delamination when the functional member is incorporated into a part of various instruments in view of production of thinner instruments and so forth.

As for the method for removing the protective sheet from the functional layer by delamination, for example, by adhering an arbitrary adhesive sheet to the protective sheet and then pulling the adhesive sheet, the adhesive sheet and the protective sheet can be removed from the functional layer by delamination. Further, by adhering an arbitrary adhesive sheet to the surface of the functional layer opposite to the surface having the protective sheet, and then pulling the adhesive sheet, the protective sheet can be removed from the adhesive sheet and the functional layer by delamination. In the latter case, the functional member having the adhesive sheet can also be adhered as it is to an object by using the adhesive sheet.

Further, when the adhesive layer of the protective sheet contains a curable resin as a resin component, it is preferable to give external energy to the curable resin to cure the curable resin, and then delaminate the protective sheet from the functional layer.

When a curable resin is contained in the adhesive layer constituting the protective sheet, by giving external energy to the curable resin to cure and shrink the curable resin, adhesion strength between the adhesive layer and the functional layer can be decreased. Therefore, the adhesive layer and the functional layer can be adhered with adhesion strength higher than adhesion strength between the base material and the functional layer before giving external energy to the curable resin, and the functional layer can be delaminated from the base material. Then, after external energy is given to the curable resin, the adhesion strength between the adhesive layer and the functional layer is decreased, and therefore the protective sheet can be easily removed from the functional layer by deramination without cohesive fracture of the functional layer or the protective sheet. When an ionizing radiation curable resin is chosen as the curable resin, the ionizing radiation irradiated for further curing the functional layer mentioned above can also be used as the external energy. Therefore, the functional layer can be further cured to have sufficient strength, and at the same time, the adhesion strength between the functional layer and the protective sheet can be decreased to efficiently produce a base material-less functional member.

Examples of such a curable resin contained in the adhesive layer include ionizing radiation curable resins and thermosetting resins. As the ionizing radiation curable resins, the same resins as those mentioned above as the ionizing radiation curable resin constituting the functional layer can be used. As the thermosetting resins, it is preferable to use a thermosetting resin of which adhesion strength is decreased by heat curing attained by applying heat.

As the external energy used for controlling the adhesion strength of the curable resin, when the curable resin is an ionizing radiation curable resin, the same ionizing radiation as those used for curing the aforementioned ionizing radiation curable resin constituting the functional layer can be mentioned. When the curable resin is a thermosetting resin, heat can be mentioned as the external energy.

The adhesion strength between the functional layer and the protective sheet before imparting external energy to the curable resin of the adhesive layer is not particularly limited, so long as the strength is higher than the adhesion strength between the base material and the functional layer. However, it is preferably 5 N/25 mm or higher in view of the production of the base material-less functional member of the present invention. On the other hand, the adhesion strength between the functional layer and the protective sheet after imparting external energy to the curable resin of the adhesive layer is preferably 0.3 N/25 mm or lower in view of prevention of cohesive failure of the functional layer or the protective sheet.

Moreover, after the step (3), the step of irradiating the functional layer with ionizing radiation again to further cure the functional layer is preferably performed before delaminating the protective sheet from the functional layer, or after delaminating the protective sheet from the functional layer.

The functional layer which is in a half-cured state by the step (3) can be further cured to by irradiating the functional layer with ionizing radiation again to sufficiently secure strength of the functional layer. As for degree of further curing the functional layer, it is preferable to completely cure the functional layer in view of obtaining more sufficient strength of the functional layer.

Further, by performing the irradiation of ionizing radiation to the functional layer by two steps to cure the functional layer, thermal deformation of the base material due to irradiation of the ionizing radiation can be suppressed as much as possible, and a functional layer with higher precision can be produced, compared with the conventional production methods in which the functional layer is cured by one step.

Further, although either of the further curing of the functional layer and the delamination of the protective sheet from the functional layer may be performed first as described above, it is preferable to further cure the functional layer first and then delaminate the protective sheet, since the shape of the functional surface of the functional layer is maintained better.

The irradiation of ionizing radiation for further curing the functional layer can be performed in the same manner as that of the irradiation method used for half-curing the functional layer mentioned above.

As described above, according to the production method of this embodiment, a base material-less functional member can be produced without being influenced by curl, destruction of the layer etc. Therefore, the method can be suitably used in the fields of various optical films, for which flatness and smaller thickness is simultaneously desired, such as light diffusing films, light control films, prism sheets, Fresnel lens sheets, lenticular lens sheets, polarization films, phase difference films, electromagnetic wave shielding films, light reflecting films and nonreflective films, cell culture chips, DNA chips, bio-devices, energy devices, and so forth.

Second Embodiment

This embodiment is characterized in that the functional layer containing an ionizing radiation curable resin is filled between the base material and the mold, and an adhesive sheet adhered to a part of the functional layer is used for delaminating the functional layer from the base material.

Figure 3:
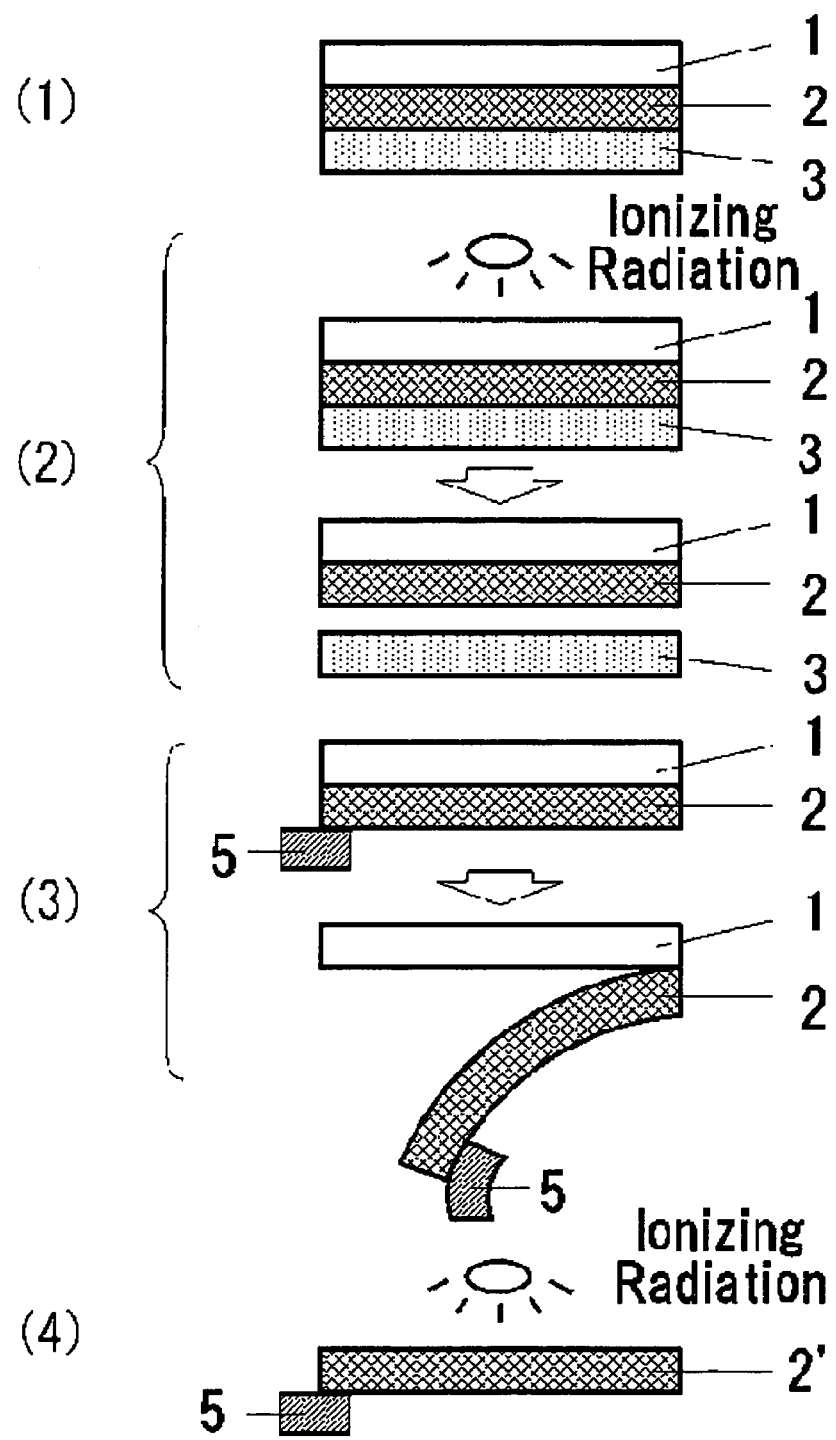
FIG. 3 is a sectional view showing the second embodiment of the method for producing a base material-less functional member of the present invention.

FIG. 3 is a sectional view for explaining an example of the method for producing a base material-less functional member of this embodiment. FIG. 3, (1) shows the step of filling a functional layer 2 comprising an ionizing radiation curable resin, to which a concavo-convex pattern is transferred, between a base material 1 and a mold 3 having the predetermined concavo-convex pattern, (2) shows the step of irradiating the functional layer 2 with ionizing radiation to half-cure the functional layer 2, and then delaminating the functional layer 2 and the base material 1 from the mold 3, (3) shows the step of adhering a protective sheet 5 to a part of the functional layer 2, and delaminating the functional layer 2 from the base material 1 starting from a portion to which the adhesive sheet 5 is adhered, and (4) shows the step of irradiating the functional layer 2 with ionizing radiation again to further cure the functional layer 2 to obtain a base material-less functional member 2'.

The functional layer filled between the base material and the mold of the present invention is a layer which can exhibit a specific function by a concavo-convex pattern complementarily transferred from the mold having a concavo-convex pattern. Examples of such a functional layer include light diffusing layers, mat layers, backcoat layers, nonreflective layers, lens layers and so forth, which can exhibit various functions as whole functional members, for example, various optical films such as light diffusing films, light control films, prism sheets, Fresnel lens sheets, lenticular lens sheets and nonreflective films, cell culture chips, DNA chips, bio-devices, energy devices, and so forth.

As the materials of the base material 1, mold 3 and functional layer 2 used in this embodiment, the same materials as those mentioned for the first embodiment can be used.

First, the step (1) of this embodiment will be explained.

As for the method for filling the functional layer between the base material and the mold having a concavo-convex pattern, a coating solution for functional layers prepared by mixing the materials constituting the functional layer, i.e., the aforementioned ionizing radiation curable resin, other resin components mentioned above, and so forth, can be coated on the base material mentioned above by a conventionally known method such as bar coating, blade coating, spin coating, roll coating, gravure coating, curtain flow coating, die coating, spray coating and screen printing, and the surface of the base material applied with the coating solution for functional layers and the concavo-convex surface of the mold having a concavo-convex pattern can be faced each other to fill the functional layer between them. Alternatively, the aforementioned coating solution for functional layers can be applied to the convexo-concave surface of the mold having a concavo-convex pattern by an application method such as those mentioned above, and the base material can be faced the surface of the mold to fill the functional layer between them.

The step (2) is the same as that of the first embodiment, in which the functional layer filled between the base material and the mold in the step (1) is irradiated with ionizing radiation and thereby half-cured, and then the functional layer and the base material are delaminated from the mold.

Also in this embodiment, by controlling the irradiation dose of the ionizing radiation irradiated to the functional layer to make the functional in a half-cured state, the functional layer and the base material can be delaminated from the mold in a state that the base material and the functional layer are not firmly adhered, and they are in a delaminable state. Therefore, a base material-less functional member can be produced without causing degradation of function due to destruction of the layer etc. Further, since the base material can delaminated from the functional layer in a half-cured state, the dose of the ionizing radiation irradiated to the functional layer can be decreased compared with the conventional production methods. Consequently, thermal deformation of the base material due to the irradiation of ionizing radiation and deformation of the functional layer in contact with the base material can be reduced, and a functional member with higher precision can be produced.

It might be considered that if the base material deformed by heat can be delaminated even after the functional layer is completely cured, deformation of the functional layer in contact with the base material may also be ameliorated. However, it is difficult to delaminate the base material without destroying the functional layer as described above, and even if such delamination might be possible, the functional layer is completely cured in a shape following the thermally deformed base material, and therefore the deformation of the functional layer would not be ameliorated. Therefore, it can be said that a technique of decreasing thermal deformation of the base material by controlling irradiation dose of ionizing radiation to such a level that the functional layer should be half-cured as in the present invention is useful.

The method of irradiating ionizing radiation to the ionizing radiation curable resin constituting the functional layer is the same as that explained for the step (2) of the first embodiment, and the meaning of the term "half-cure" is the same as that explained for the first embodiment.

The adhesion strength between the base material and the functional layer in a state that the functional layer is half-cured by the aforementioned irradiation of the ionizing radiation to the functional layer is not particularly limited, so long as the strength is higher than the adhesion strength between the mold having a concavo-convex pattern and the functional layer, and lower than the adhesion strength between the functional layer and the adhesive sheet mentioned later. However, the upper limit of the strength is preferably 2.5 N/25 mm or lower in view of the production of the base material-less functional member of the present invention. Further, the adhesion strength between the mold having a concavo-convex pattern and the functional layer in a state that the functional layer is half-cured is not also particularly limited, so long as the strength is lower than the aforementioned adhesion strength between the base material and the functional layer. However, it is preferably 2 N/25 mm or lower in view of making it easy to delaminate the functional layer from the mold, and the lower limit thereof is more preferably 0.2 N/25 mm or higher.

Then, in the step (3), an adhesive sheet is adhered to a part of the functional layer, and the functional layer is delaminated from the base material starting from a portion to which the adhesive sheet is adhered.

In the step (3), the adhesive sheet is adhered to only a part of the functional layer, and by pulling the adhesive sheet at a portion to which the adhesive sheet is adhered as the starting point, the layers of the functional layer and the base material are separated, and the functional layer can be delaminated from the base material. According to this method, the adhesive sheet adhered to the functional layer at the time of delaminating the functional layer from the base material can be minimized compared with the conventional methods, therefore time and labor for delaminating the adhesive sheet from the functional layer and delamination electrification which may take place upon removal of the adhesive sheet by delamination can be eliminated, and a base material-less functional member can be efficiently produced with good workability.

It might be considered that the adhesive sheet may be adhered to the base material, not to the functional layer, and the base material may be delaminated from the functional layer. However, if an adhesive sheet is adhered to the base material and pulled, the functional layer follow the base material if there is no countermeasure, and the functional layer cannot be delaminated from the base material. Therefore, it is necessary to fix the functional layer with a certain means. However, since the functional layer is not sufficiently cured yet as described above, if the functional layer is fixed, it will be adversely affected, e.g., deformed, and the yield will worsen as a result compared with the case where the adhesive sheet is adhered to the functional layer. Therefore, it cannot be said that the method of adhering an adhesive sheet on the base material is appropriate.

Figure 4:
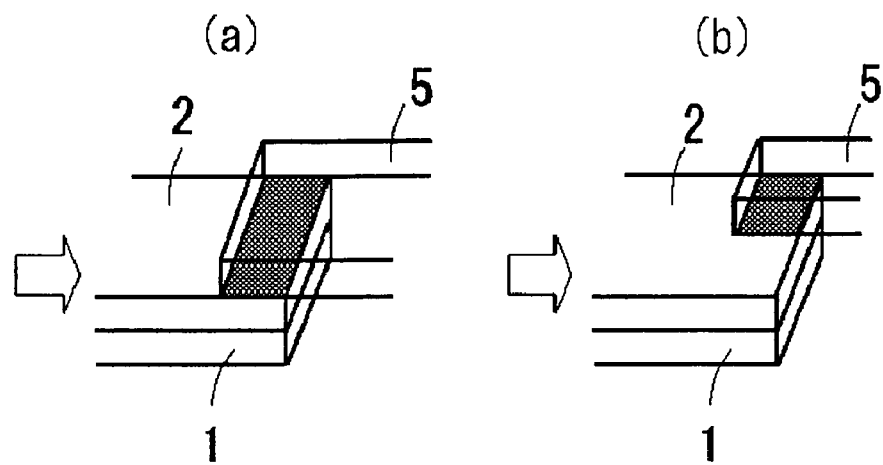
FIG. 4 is a perspective view showing an embodiment in which an adhesive sheet is adhered to a part of the functional layer.

Further, the term "part" referred to here means a part covering 30% or less, preferably 5% or less, more preferably 1% or less, of the functional surface of the functional layer, in view of efficient production of the functional member with no reduction of the production yield of the functional member. Further, although position of the "part" may any position on the functional layer, it is preferably an end part of the functional layer. As shown in FIG. 4, for example, it may be (a) one end part along the long side of the functional layer, or (b) only a part around one corner of one end part along the long side.

The adhesive sheet used in the present invention has an adhesive property at least to the functional layer, and shows adhesion strength to the functional layer higher than adhesion strength between the base material and the functional layer. Although the adhesive sheet may consists of a single layer of an adhesive layer, a multi-layer structure comprising a support and an adhesive layer formed on the support is more preferred in view of operation and handling property of the produced base material-less functional member.

The adhesion strength between the functional layer and the adhesive sheet is preferably 5 N/25 mm or higher, particularly preferably 5 to 20 N/25 mm, in view of production of the base material-less functional member of the present invention.

When the adhesive sheet consists of a support and an adhesive layer, the same materials as those mentioned for the base material can be used as the support. Although thickness of the support is not particularly limited, it is preferably 30 to 100 µm in consideration of the handling property at the time of transportation etc.

As the adhesive layer, conventionally known resins mentioned as adhesives can be used. Specific examples include those exemplified as the materials of the adhesive layer of the protective sheet of the first embodiment, and the adhesive layer may contain the same additives as those mentioned for the adhesive layer of the protective sheet.

The adhesive layer preferably has a thickness of about 5 to 40 µm. With a thickness in such a range, it can be made easier to obtain desired adhesion ability.

The adhesive sheet used in the present invention is used for delamination of the functional layer from the base material, and only a portion of the functional layer not adhered with the adhesive sheet is usually used, while a portion of the functional layer adhered with the adhesive sheet is discarded. However, when an adhesive sheet containing a curable resin of which adhesion strength is decreased by giving external energy is used as a material constituting the adhesive sheet (adhesive layer), a portion of the functional layer to which the adhesive sheet is adhered may not be discarded, but can also be used. Examples of such a curable resin of which adhesion strength decreases include ionizing radiation curable resins, thermosetting resins, and so forth. Examples of the external energy given to the curable resin include light (ionizing radiation), heat, and so forth.

In the step (4) of this embodiment, the step of irradiating the functional layer with ionizing radiation again to further cure the functional layer is performed.

The functional layer is in a half-cured state by the step (3), and it is further cured by irradiating with ionizing radiation after delamination of the functional layer from the base material in view of sufficiently securing the strength of the functional layer. As for degree of further curing the functional layer, it is preferable to completely cure the functional layer in view of obtaining more sufficient strength of the functional layer.

Since ionizing radiation is once irradiated, then the base material is delaminated from the functional layer, and thereafter only the functional layer is irradiated with ionizing radiation again to produce a base material-less functional member as described above, the dose of the ionizing radiation irradiated to the base material can be decreased compared with the conventional methods. Consequently, thermal deformation of the base material due to the irradiation of ionizing radiation can be suppressed as much as possible, and at the same time, bad influence of the deformation of the base material on the functional layer in contact with the base material can also be decreased. Thus, a functional layer with higher precision can be produced.

The irradiation of ionizing radiation for completely curing the functional layer can be performed in the same manner as that of the irradiation method used for half-curing the functional layer mentioned above.

Figure 5:
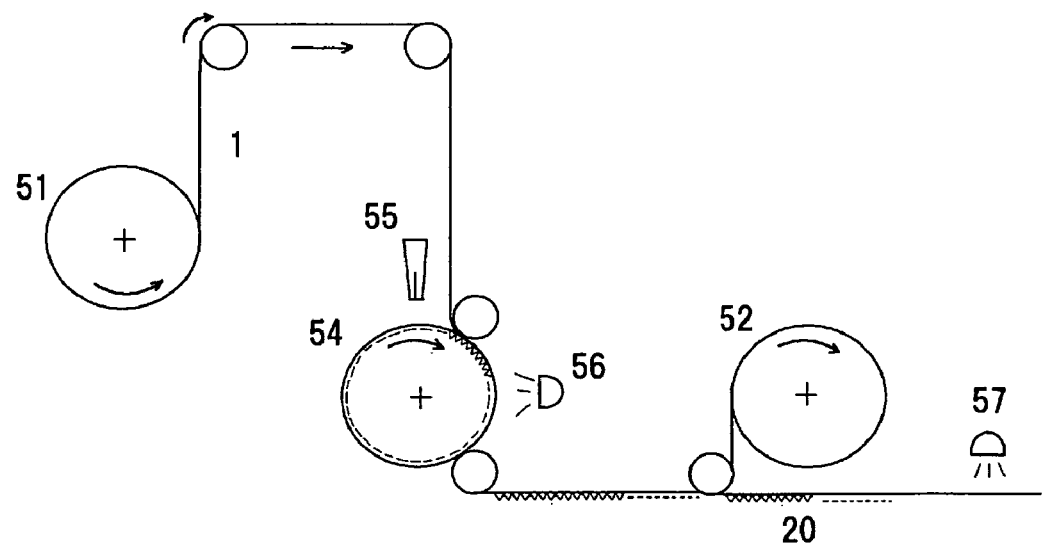
FIG. 5 is a drawing showing a continuous process according to the second embodiment.

A base material-less functional member can be continuously produced by the method for producing a base material-less functional member of this embodiment by continuously supplying the base material used in the steps (1) to (3). An example of continuous production apparatus is shown in FIG. 5. The production apparatus shown in the drawing comprises a roll 51 for supplying a base material 1, a rolling-up roll 52, a mold roll 54 disposed at such a position that it should be pressed onto the base material 1 on the transportation way of the base material 1, a resin feeding means 55 for functional layers disposed on the upstream side of the mold roll 54 on the base material supplying route, an ionizing radiation irradiation means 56 for irradiating ionizing radiation to the laminate of the mold roll, the resin and the base material to half-cure the functional layer, and an ionizing radiation irradiation means 57 for further curing the resin of the functional layer.

In this production apparatus, while continuously supplying the base material from the supplying roll 51, (1) a resin constituting the functional layer is filled between the base material 1 and the mold at the first station, (2) ionizing radiation is irradiated to half-cure the functional layer, and then the functional layer and the base material are delaminated from the mold at the second station, and (3) an adhesive sheet (not shown) is adhered to a part of the functional layer, and the functional layer is delaminated from the base material starting from a portion to which the adhesive sheet is adhered at the third station. The base material from which the functional layer is delaminated is rolled by the rolling-up roll 52. The functional layer delaminated from the base material is sent to the forth station, and irradiated with ionizing radiation again there to be further cured. Throught such a continuous process, a base material-less functional member can be efficiently produced.

When the production is carried out by a continuous process, shape of the mold may be any shape so long as continuous production of a base material-less functional member is enabled. Besides such a mold in the form of roll as shown in the drawing, for example, those in the form of belt, stamper and so forth are used. As the material of the mold, for example, rubber materials, resin materials, metals, composites and so forth can be used.

Flow rate of the base material is preferably a rate of 1 to 40 m/minute for enabling stable continuous production of a base material-less functional member. Although the production apparatus shown in FIG. 5 employs a configuration that the base material is transported from the supplying roll to the rolling-up roll, an endless base material may also be used to circulate it in the process steps.

Moreover, in the step (3), when the functional layer is delaminated from the base material, by pulling the adhesive sheet adhered to only a portion of the functional layer in a direction different from the flowing direction of the supplied base material, and continuously transporting the base material, the layers of the functional layer and the base material can be separated. Alternatively, the functional layer may be passed through the third station in a flat state while appropriately deforming the base material to delaminate the base material. In view of prevention of undue deformation of the functional layer, the latter method is preferred.

According to this embodiment utilizing a continuous process, the adhesive sheet, which is just a peg for delamination of the functional layer and the base material, may be adhered only a part of the flowing functional layer. Therefore, a base material-less functional member can be efficiently produced continuously while reducing use of the adhesive sheet as much as possible. In addition, the adhesive sheet is more preferably adhered to the forward end of the functional layer with respect to the flowing direction of the supplied functional layer for enabling efficient continuous production of a base material-less functional member.

The production method of the present invention is explained above with reference to the embodiments thereof. However, the production method of the present invention is characterized by forming a functional layer between a base material and a mold, then delaminating the functional layer in a half-cured state from the mold, and further delaminating the functional layer from the base material using a protective sheet or an adhesive sheet, and the conditions of the steps and materials used in the steps explained for the embodiments may be suitably changed without departing from the spirit of the present invention.

According to the production method of the present invention, a base material-less functional member can be efficiently produced without suffering from any influences of destruction of the layer and so forth. Therefore, it can be suitably used in the fields of various optical films, of which components are desired to be made thinner without causing the problem of curl, such as light diffusing films, light control films, prism sheets, Fresnel lens sheets, lenticular lens sheets, polarization films, phase difference films, electromagnetic wave shielding films, light reflecting films and nonreflective films, cell culture chips, DNA chips, bio-devices, energy devices, and so forth.

EXAMPLES

Hereafter, the present invention will be further explained with reference to examples. The term and symbol "part" and "%" are used on weight basis, unless specifically indicated.

Example 1

On a mold having regularly disposed multiple unit prism shapes each having a vertical angle of 90° with a pitch of 50 μm, a coating solution for functional layers having the following composition was applied, and a polyethylene terephthalate film having a thickness of 100 μm (COSMOSHINE A4100, Toyobo Co., Ltd.) as a base material was adhered to fill a functional layer on which prism shapes complimentary to the prism shapes of the mold were formed (total thickness of the functional layer: 30 μm, thickness of the solid portion: 5 μm) between the polyethylene terephthalate film and the mold.

| <Coating solution for functional layers> | |
| --- | --- |
| Acrylic monomer (methyl methacrylate, Wako Pure Chemical Industries) | 50 parts |
| Polyfunctional acrylic monomer (NK Ester A-TMPT-3EO, Shin-Nakamura Chemical Co., Ltd.) | 45 parts |
| Photopolymerization initiator (Irgacure 184, Ciba Japan K.K.) | 5 parts |

Then, the functional layer and the polyethylene terephthalate film laminated on the mold in this order were irradiated from the polyethylene terephthalate film side with ultraviolet radiation of 75 mJ/cm$^2$ from a high pressure mercury lamp to half-cure the functional layer, and then the polyethylene terephthalate film and the functional layer were delaminated from the mold. At the time of the delamination, the adhesion strength between the functional layer and the mold was 1 N/25 mm, and the adhesion strength between the polyethylene terephthalate film and the functional layer was 2.1 N/25 mm.

Subsequently, a protective sheet (SOMATAC UV 125UV, SOMAR Corp., having an adhesive layer containing ultraviolet curable resin) was adhered to the functional layer, and by pulling the protective sheet, the protective sheet and the functional layer could be delaminated from the polyethylene terephthalate film. In this operation, the functional layer could be delaminated from the polyethylene terephthalate film without any bad influence such as destruction of the layer, and the functional layer having no base material (functional member consisting of the functional layer and the protective sheet) could be produced. At the time of the delamination, the adhesion strength between the protective sheet and the functional layer was 6.1 N/25 mm.

Further, the above functional member was irradiated again with ultraviolet radiation of 600 mJ/cm$^2$ from a high pressure mercury lamp. Crosslinking was further advanced by the irradiation of ultraviolet radiation, and the functional layer was completely cured. Moreover, the ultraviolet curable resin contained in the adhesive layer was crosslinked and cured by the irradiation of ultraviolet radiation as external energy, and the adhesion strength between the protective sheet and the functional layer decreased to 0.15 N/25 mm or lower.

Since the adhesion strength decreased, the protective sheet could be easily delaminated from the functional layer, and a base material-less functional member consisting solely of the functional layer could be produced.

Example 2

At the first station, a polyethylene terephthalate film having a thickness of 100 μm (COSMOSHINE A4100, Toyobo Co., Ltd.) as a base material was continuously supplied at a rate of 10 m/minute, and adhered to the same mold for prism sheets as that of Example 1 applied with a coating solution for functional layers having the same composition as that of Example 1 to fill a functional layer on which prism shapes complementary to the prism shapes of the mold were formed (total thickness of the functional layer: 30 μm, thickness of the solid portion: 5 μm) between the polyethylene terephthalate film and the mold.

Then, at the second station, the functional layer and the polyethylene terephthalate film laminated on the mold in this order were irradiated from the polyethylene terephthalate film side with ultraviolet radiation of 75 mJ/cm$^2$ from a high pressure mercury lamp to half-cure the functional layer, and then the mold was delaminated from the polyethylene terephthalate film and the functional layer according to the flow of the supplied polyethylene terephthalate. At the time of the delamination, the adhesion strength between the functional layer and the mold was 1 N/25 mm, and the adhesion strength between the polyethylene terephthalate film and the functional layer was 2.1 N/25 mm.

Subsequently, at the third station, a polyester tape (Nichiban Co., Ltd.) was adhered to a portion of the forward end of the functional layer with respect to the flowing direction of the functional layer, and by pulling the functional layer at a portion to which the polyester tape was adhered as the starting point of delamination in a direction different from the flowing direction of the polyethylene terephthalate film, the functional layer was delaminated from the polyethylene terephthalate film. In this operation, the functional layer could be delaminated from the polyethylene terephthalate film without any influence such as destruction of the layer. At the time of the delamination, the adhesion strength between the polyester tape and the functional layer was 20 N/25 mm.

The functional layer delaminated from the polyethylene terephthalate film was irradiated again with ultraviolet radiation of 600 mJ/cm$^2$ form a high pressure mercury lamp to completely cure the functional layer. By continuously performing the aforementioned operation according to the flow, the functional layer having no base material (polyethylene terephthalate film) could be efficiently and continuously produced (base material-less functional member of the present invention). The base material-less functional member obtained in this example showed no curl, and had a total thickness of 30 μm. Thus, it was suitable for use requiring a thin shape.

What is claimed is:

1. A method for producing a base material-less functional member, which comprises successively performing the following steps (1) to (4):
    (1) a step of forming a functional layer comprising an ionizing radiation curable resin between a mold having a predetermined concavo-convex pattern and a base material,
    (2) a step of irradiating the functional layer with ionizing radiation to half-cure the functional layer, and then delaminating the functional layer and the base material from the mold,
    (3) a step of delaminating the functional layer from the base material and adhering a protective sheet to at least a part of the functional layer, wherein the protective sheet is peelable from the functional layer and comprises a plastic film and an adhesive layer,
    (4) a step of delaminating the protective sheet from the functional layer.

2. The method for producing a base material-less functional member according to claim 1, wherein:
    the step (1) comprises the step of laminating the functional layer comprising an ionizing radiation curable resin and the base material on the mold having a predetermined concavo-convex pattern in this order.

3. The method for producing a base material-less functional member according to claim 1, wherein:
    the step (1) comprises filling the ionizing radiation curable resin between the base material and the mold.

4. The method for producing a base material-less functional member according to claim 1, wherein:
    the protective sheet has an adhesive layer, the adhesive layer contains a curable resin, and after the curable resin is cured by imparting external energy to the curable resin, the protective sheet is delaminated from the functional layer.

5. The method for producing a base material-less functional member according to claim 4, wherein:
the adhesive layer of the protective sheet contains an ionizing radiation curable resin,
the method comprises the step of irradiating the functional layer with ionizing radiation again to further cure the functional layer, which is performed after the step (3), and after this step, the protective sheet is delaminated from the functional layer.

6. A method for producing a base material-less functional member, which comprises successively performing the following steps (1) to (3):
(1) a step of forming a functional layer comprising an ionizing radiation curable resin between a mold having a predetermined concavo-convex pattern and a base material,
(2) a step of irradiating the functional layer with ionizing radiation to half-cure the functional layer, and then delaminating the functional layer and the base material from the mold, and
(3) a step of adhering an adhesive sheet to only an end part of the functional layer, and delaminating the functional layer from the base material starting from the end part of the functional layer to which the adhesive sheet is adhered.

7. The method for producing a base material-less functional member according to claim 1, wherein:
a step of irradiating the functional layer with ionizing radiation again to further cure the functional layer is performed after the step (3).

8. The method for producing a base material-less functional member according to claim 1, wherein:
in a state that the functional layer is half-cured, adhesion strength between the base material and the functional layer is not higher than 2.5 N/25 mm.

9. The method for producing a base material-less functional member according to claim 6, wherein:
adhesion strength between the functional layer and the adhesive sheet is not lower than 5 N/25 mm.

10. The method for producing a base material-less functional member according to claim 1, wherein:
the base material-less functional member is continuously produced by continuously supplying the base material.

11. The method for producing a base material-less functional member according to claim 1, wherein:
the base material-less functional member is a prism sheet.

12. A method for producing a base material-less functional member, which comprises successively performing the following steps (1) to (3):
(1) a step of laminating a functional layer comprising an ionizing radiation curable resin and a base material in this order on a mold having a predetermined concavo-convex pattern,
(2) a step of irradiating the functional layer with ionizing radiation to half-cure the functional layer, and then delaminating the functional layer and the base material from the mold, and
(3) a step of adhering a protective sheet to the functional layer, and delaminating the functional layer and the protective sheet from the base material, wherein the protective sheet is peelable from the functional layer and comprises a plastic film and an adhesive layer.

13. A method for producing a base material-less functional member, which comprises successively performing the following steps (1) to (4):
(1) a step of filling a functional layer comprising an ionizing radiation curable resin to which a predetermined concavo-convex pattern is transferred between a base material and a mold having a predetermined concavo-convex pattern,
(2) a step of irradiating the filled functional layer with ionizing radiation to half-cure the functional layer, and then delaminating the functional layer and the base material from the mold,
(3) a step of adhering an adhesive sheet to only an end a part of the functional layer, and delaminating the functional layer from the base material starting from the end part of the functional layer to which the adhesive sheet is adhered, and
(4) a step of then irradiating the functional layer with ionizing radiation again to further cure the functional layer.

14. The method for producing a base material-less functional member according to claim 2, wherein:
the base material-less functional member is a prism sheet.

15. The method for producing a base material-less functional member according to claim 1, wherein:
when the protective sheet is adhered to at least a part of the functional layer, a portion of the protective sheet is not adhered to the functional layer and extends free beyond the functional layer; and wherein
the functional layer is delaminated from the base material by pulling the adhesive sheet.

16. The method for producing a base material-less functional member according to claim 12, wherein:
when the protective sheet is adhered to at least a part of the functional layer, a portion of the protective sheet is not adhered to the functional layer and extends free beyond the functional layer; and wherein
the functional layer is delaminated from the base material by pulling the adhesive sheet.

17. The method for producing a base material-less functional member according to claim 6, wherein:
when the adhesive sheet is adhered to the end part of the functional layer, a portion of the protective sheet is not adhered to the functional layer and extends free beyond the functional layer; and wherein
the functional layer is delaminated from the base material by pulling the adhesive sheet.

18. The method for producing a base material-less functional member according to claim 13, wherein:
when the adhesive sheet is adhered to the end part of the functional layer, a portion of the protective sheet is not adhered to the functional layer and extends free beyond the functional layer; and wherein
the functional layer is delaminated from the base material by pulling the adhesive sheet.

19. The method for producing a base material-less functional member according to claim 6, wherein the end part of a surface to which the adhesive sheet is adhered is 30% or less of the surface.

20. The method for producing a base material-less functional member according to claim 13, wherein the end part of a surface to which the adhesive sheet is adhered is 30% or less of the surface.

* * * * *